United States Patent Office 2,791,281
Patented May 7, 1957

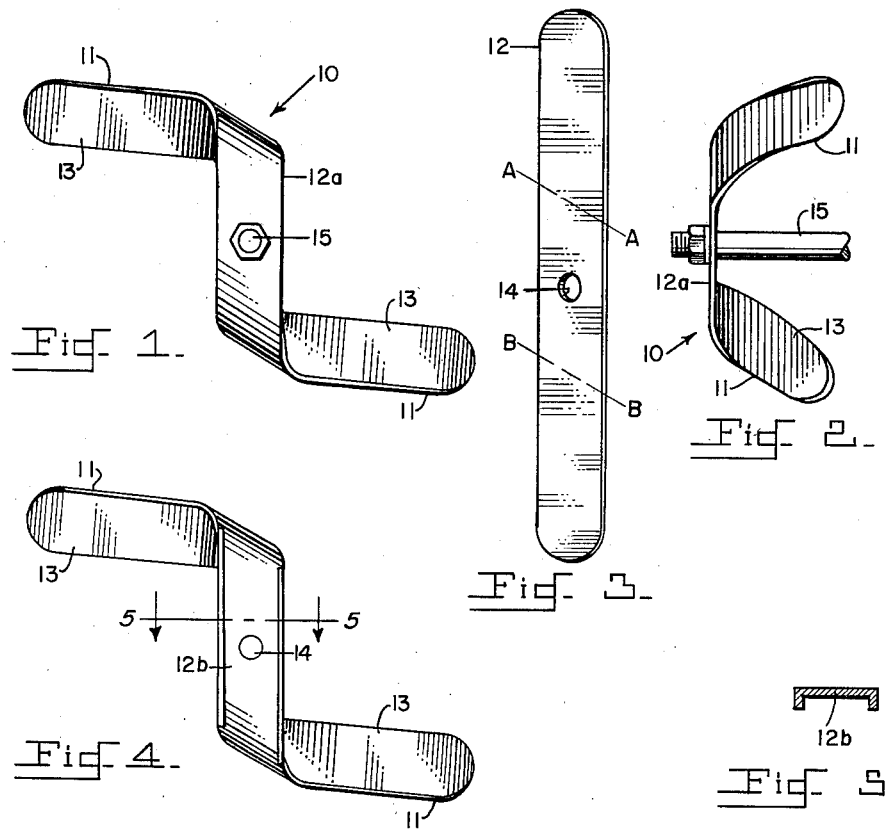
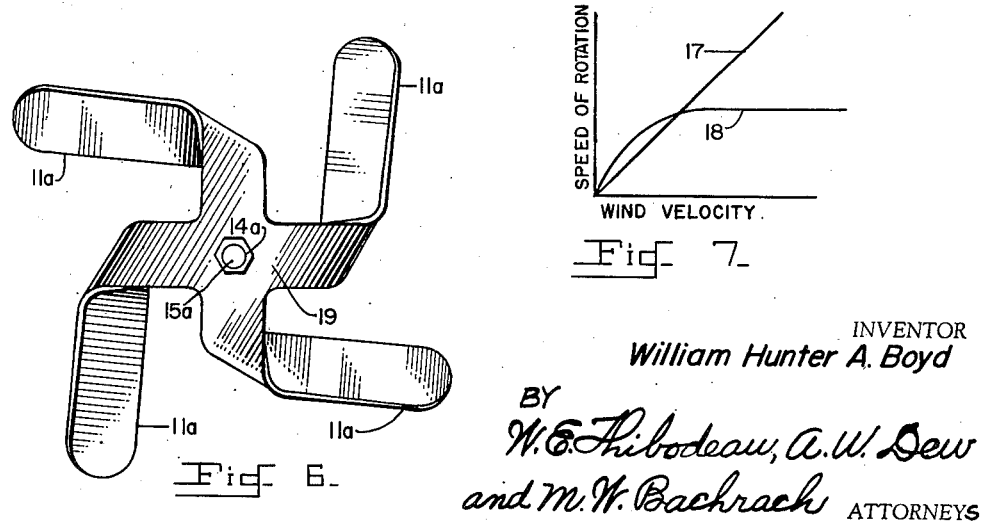

2,791,281

VARIABLE PITCH WINDMILL

William Hunter A. Boyd, Kensington, Md., assignor to the United States of America as represented by the Secretary of the Army Application March 18, 1955, Serial No. 495,368

2 Claims. (Cl. 170—79)

(Granted under Title 35, U. S. Code (1952), sec. 266)

The invention described herein may be manufactured and used by or for the Government for governmental purposes without the payment to me of any royalty thereon.

This invention relates to ordnance items and particularly to a variable pitch windmill adapted to supply motive power thereto.

Windmills and wind driven turbines are not new in ordnance. They have long been used to supply the motive power required. It is a requirement, when windmills or wind driven turbines are used, that their speed of rotation be maintained substantially constant. Unless some compensating means is provided, the speed of rotation varies in proportion to the force of the wind against them. Various methods have been employed aimed at maintaining the speed of rotation constant despite variations in the wind force. Those variations, in ordnance items, are due to the change in velocity of the item and the change in the density of the air through which it travels.

One object of this invention is a new and novel variable-pitch self-regulating windmill.

Another object is a variable-pitch self-regulating windmill, the speed of rotation of which is virtually independent of the wind force against the blades.

A further object is a variable-pitch self-regulating windmill which makes use of the centrifugal forces acting upon the blades for its regulation.

A still further object is a simple and inexpensive variable-pitch self-regulating windmill.

The specific nature of the invention, as well as other objects and advantages thereof, will clearly appear from the following description and drawings wherein:

Figure 1 is a front elevational view of a twin bladed windmill designed in accordance with the invention.

Figure 2 is a side view of the invention shown in Figure 1.

Figure 3 is a perspective view of a blank from which a twin bladed windmill is formed.

Figure 4 is a front elevational view of a twin-bladed windmill, the unbent portion having been made essentially rigid.

Figure 5 is a cross sectional view of the invention taken on line 5—5 of Figure 4.

Figure 6 is a front elevational view of a four bladed windmill in accordance with the invention.

Figure 7 is a pair of curves, one showing the performance of a conventional windmill, the other showing the performance of a windmill in accordance with the invention.

Referring to Fig. 1, the windmill is indicated generally by numeral 10. The embodiment shown has a single pair of blades 11, 11 which are formed by bending the upper portion of elongated plate 12, Fig. 3, rearwardly and to the left along line A—A and by bending the lower portion of elongated plate 12 rearwardly and to the right along line B—B. Lines A—A and B—B are at an angle of approximately 45° with respect to the longitudinal axis of elongated plate 12. It is important that the blades 11, 11 be bent through such an angle that the rear surface of elongated plate 12 becomes the faces 13, 13 of the blades. The blank from which windmill 10 is formed is of spring steel or other resilient material.

Perforation 14, positioned centrally of the windmill, is provided for the purpose of receiving one end of shaft 15 for mounting the windmill thereon, the other end of shaft 15 being coupled directly to the driven unit, not shown.

In their "at rest" positions blade faces 13, 13, Fig. 1, make an angle with the flat surface of the unbent portion 12a of elongated plate 12. This angle is the "pitch angle" of the blades. Generally speaking the greater the pitch angle, the lower the rotational speed of the windmill for any given wind velocity. If it is desired to maintain the controlled speed of the windmill relatively low, the initial pitch angle is made quite large.

If the blades of windmill 10 were inflexible, the speed of rotation of the windmill would increase in proportion to the velocity of the wind. That relationship is illustrated by curve 17 of Fig. 7. Inasmuch as the velocity of a bomb, for example, increases essentially linearly with distance as it falls to earth, the distance factor could, for the sake of illustration, be substituted for wind velocity in curve 17 of Fig. 7. It can be seen that the speed of rotation of the conventional windmill is not maintained constant under those conditions.

The windmill in accordance with this invention is responsive to the centrifugal force acting upon the windmill blades. That force tends to return the blades to the unbent form shown in Fig. 3. The moment arm of the forces tending to "straighten out" the blades is equal to the instantaneous perpendicular distance from the flat surface of the unbent portion 12a of elongated plate 12 to the center of gravity of the blades.

As the speed of the ordnance item increases, the wind moving past the windmill blades causes the speed of rotation of the windmill to tend to increase proportionately. As the speed of rotation of the windmill increases the centrifugal force acting upon the windmill blades increases causing the blades 11, 11 to tend to assume their original unbent form. The pitch angle of the blades increases thereby, causing the speed of rotation of the windmill to tend to decrease. The net effect is that the speed of rotation remains essentially constant regardless of the velocity of the wind with respect to the ordnance item. That relationship is illustrated by curve 18 of Fig. 7.

In this invention, when the tendency of the windmill blades to retain their bent shape just counteracts the centrifugal force acting upon the blades urging them to resume their unbent shape, then the rotation of the windmill has reached the regulated operating speed. Thereafter, the speed of rotation remains relatively constant so long as the original blade faces engage the wind. Should the blades approach their unbent shape to the extent that the reverse side of the blade faces engage the wind, the windmill would reverse direction and the windmill would no longer regulate. Thereafter, the greater the velocity of the wind the faster the windmill would turn.

It should be understood that the less resilient the windmill material the lower the speed of regulation. Conversely, the more resilient the windmill material the greater the speed of regulation. It follows that a perfectly rigid windmill would regulate only at an infinite speed. In other words, it would not regulate at all.

For any windmill configuration there is a family of curves similar to curve 18, Fig. 7, depending upon the windmill material used. For a windmill made of a particular material there is a family of curves similar to curve 18, depending upon the thickness of the material used.

In some two bladed designs it is difficult to maintain the unbent portion 12a of the elongated plate rigid. Often it is desirable to maintain the unbent portion rigid to reduce excessive vibration. By reference to Figs. 4 and 5 it can be seen that one way to accomplish this result is to give the unbent portion 12b of elongated plate 12 a "channel" cross section.

A four bladed embodiment of the invention is shown in Fig. 6. It comprises a plurality of blades 11a, 11a radiating from hub 19. Hub 19 has perforation 14a centrally thereof for receiving shaft 15a. This version can be thought of as a pair of two bladed windmills bonded together at right angles to one another. It is to be understood that the invention, which is illustrated by a two bladed windmill and a four bladed windmill, is not to be limited to any particular number of blades.

It will be apparent that the embodiments shown are only exemplary and that various modifications can be made in construction and arrangement within the scope of the invention as defined in the appended claims.

I claim:

1. A self-regulating windmill formed from an elongated plate of resilient material comprising in combination: a substantially flat elongated portion having a forward surface and a rear surface, a longitudinal axis and a transverse axis, and ends disposed along said longitudinal axis, said axes intersecting at the center of said portion; means for mounting said portion for rotation about said center; bent resilient blades each having a forwardly facing surface forming a continuation of said rear surface of said elongated portion and a rearwardly facing surface forming a continuation of said forward surface of said elongated portion, said blades integrally extending from said ends of said elongated portion, said blades being disposed substantially at an angle to said longitudinal axis; said elongated portion and said blades being so constructed and arranged that said substantial portion of said rear surface of said blades is an air deflection surface that is adapted to impart a turning moment to said windmill in response to the relative velocity of a wind engaged by said blades; said blades being resiliently responsive to centrifugal forces acting thereon as to cause said windmill to be self-regulating.

2. A self-regulating windmill formed from a plate of resilient material comprising in combination: a substantially flat hub having a center and a forward surface and a rear surface; means for mounting said hub for rotation about said center; a plurality of bent resilient blades each having a forwardly facing surface forming a continuation of said rear surface of said hub and a rearwardly facing surface forming a continuation of said forward surface of said hub, said blades integrally extending from said hub, said hub and said blades being so constructed and arranged that said substantial portion of said rear surface of said blades is an air deflection surface that is adapted to impart a turning moment to said windmill in response to the relative velocity of a wind engaged by said blades; said blades being resiliently responsive to centrifugal forces acting thereon as to cause said windmill to be self-regulating.

References Cited in the file of this patent

UNITED STATES PATENTS

| 200,066 | Klotz | Feb. 6, 1878 |
| 2,460,849 | Senn | Feb. 8, 1949 |

FOREIGN PATENTS

| 4,560 | Great Britain | Feb. 23, 1910 |